No. 614,665. Patented Nov. 22, 1898.
H. G. MORRIS.
VEHICLE WHEEL.
(Application filed Nov. 6, 1897.)
(No Model.)
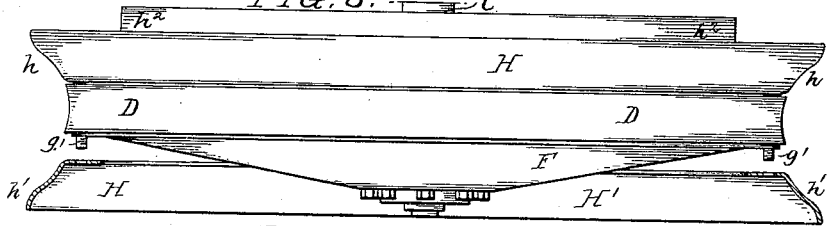
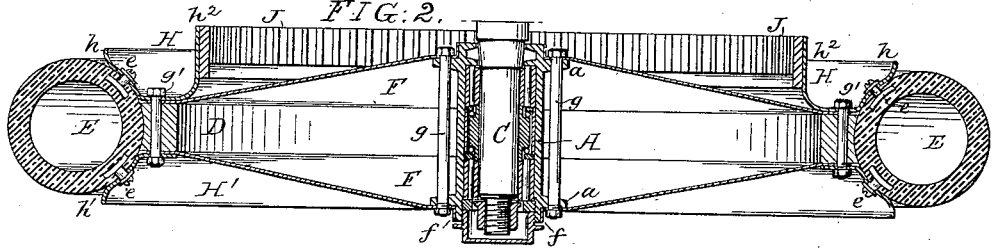
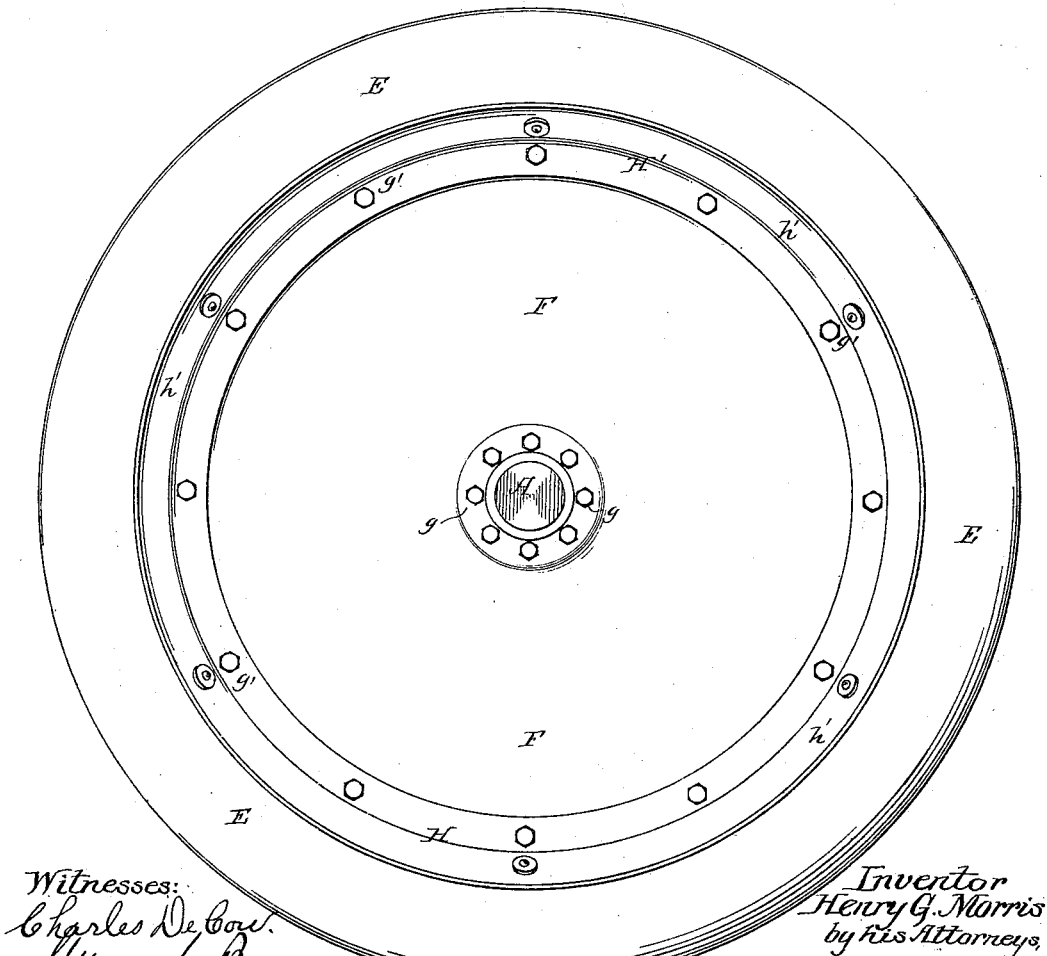
Witnesses:
Charles De Cow
Murray C. Boyer
Inventor
Henry G. Morris
by his Attorneys,
Howson & Howson

UNITED STATES PATENT OFFICE.

HENRY G. MORRIS, OF PHILADELPHIA, PENNSYLVANIA.

VEHICLE-WHEEL.

SPECIFICATION forming part of Letters Patent No. 614,665, dated November 22, 1898.

Application filed November 6, 1897. Serial No. 657,614. (No model.)

*To all whom it may concern:*

Be it known that I, HENRY G. MORRIS, a citizen of the United States, residing in Philadelphia, Pennsylvania, have invented certain Improvements in Vehicle-Wheels, of which the following is a specification.

My invention relates to certain improvements in vehicle-wheels provided with yielding tires, which may be made solid or capable of being inflated.

The object of my invention is to so construct the wheel that it will be light and at the same time of sufficent strength to sustain heavy weights; and a further object is to provide means whereby the tire can be readily removed and replaced without straining the material of which it is made.

In the accompanying drawings, Figure 1 is a side view of my improved wheel. Fig. 2 is a sectional view; and Fig. 3 is an edge view showing one of the side flanges removed and in section.

A is the hub of the wheel, having annular flanges $a\ a$. This hub is adapted to an axle C and in the present instance has roller-bearings, although the construction shown forms no part of my present invention, and, in fact, in some instances the hub may be secured directly to the axle when the axle itself is mounted in bearings.

D is a felly-ring, formed as shown in Fig. 2, having its periphery slightly concaved for the reception of the base of the tire E, which is made tubular in the present instance.

F F are two plates slightly conical in form and adapted to be secured to the flanges $a\ a$ on the hub A by bolts $g\ g$. These plates are preferably flanged at $f\ f$ at the point where they rest against the hub, as shown in Fig. 2. The outer edge of each plate is secured to the felly-ring D by bolts $g'$, which also secure the two flange-rings H H' to the felly. These rings H H' have flanges $h\ h'$, curved, as shown in Fig. 2, so as to form a bearing for the tire E, and this tire is secured to the rings by a series of clamps $e$. Each clamp is made in the present instance in the form of a socket, having a head incased in the tire. Adapted to the socket is a screw which clamps a washer onto the ring, so as to hold the tire firmly to the ring; but it will be understood that other forms of clamps may be used, if desired.

The ring H has a deep internal flange $h^2$, on which is mounted an annular rack J, having teeth which engage with a pinion of the driving mechanism, so that the wheel in the present instance is adapted to be driven through the medium of the pinion and the annular rack or internal gear-wheel.

My invention is especially adapted to wheels for carrying heavy loads, such as carriage and wagon wheels; and to mount tires on wheel-centers they have to be stretched by the ordinary methods to such an extent as to injure them. By my invention I can apply a tire to the wheel by simply detaching the side flange-ring H', removing one tire, and replacing it with another without stretching the tire unnecessarily. The tire can be made to fit snugly upon the felly-ring D with enough tension to give it a firm seat, and after the flange-ring H is replaced the tire can be coupled to the two flange-rings by means of the clamps $e$, which prevent the tire from creeping on the wheel-center.

By arranging the clamps at each side instead of at the center of the wheel I am enabled to resist side strains, and thereby hold the tire more rigidly to the wheel. This has been a great objection to wheels having inflated tires which were attached at the center of the wheel. The great pressure exerted in turning out of car-tracks and around curves often injured the tire to such an extent that it had to be discarded. The valve-tube may project from the tire through one of the flanges of the said rings H H'.

The plates F F, while shown plain, may be corrugated or ribbed without departing from my invention and may in some instances have radial openings therein when it is wished to lighten the wheel.

I claim as my invention—

1. The combination in a wheel, of a hub, a felly, dished circular plates secured to the hub and to the felly and flanged rings also secured to the felly and forming the groove for the reception of the tire, substantially as described.

2. The combination of a hub, a felly, dished plates secured to each side of the felly and to the hub, flanged rings also secured to the felly and forming the groove for the tire, one of said rings having an internal flange and an annular rack secured to said internal flange, substantially as described.

3. The combination of a hub having flanges at each end, a ring-felly having a concaved periphery, two dished circular plates, one of said plates being secured to one flange of the hub and on one side of the felly, the other plate being secured to the other flange of the hub and on the opposite side of the felly, two rings having deep flanges curved to conform to the tire and forming with the felly an annular groove for the reception of the tire, substantially as described.

4. The combination in a wheel, of a wheel-center having a hub, felly and a flanged ring adapted to each side of the felly, with a tire having clamps secured thereto and secured to the flanges of the said rings, substantially as described.

In testimony whereof I have signed my name to this specification in the presence of two subscribing witnesses.

HENRY G. MORRIS.

Witnesses:
WILL. A. BARR,
JOS. H. KLEIN.